April 27, 1948.

F. E. BEST 2,440,430

LOCK THROW MECHANISM

Original Filed Jan. 8, 1942

*Frank Ellison Best.*

INVENTOR

Patented Apr. 27, 1948

2,440,430

UNITED STATES PATENT OFFICE 2,440,430

LOCK-THROW MECHANISM

Frank Ellison Best, Indianapolis, Ind.

Original application January 8, 1942, Serial No. 425,952. Divided and this application January 15, 1945, Serial No. 572,903

12 Claims. (Cl. 70—379)

Nature and object

This is a divisional application of my co-pending application on Unpickable lock, filed January 8, 1942, Serial No. 425,952, now abandoned.

This invention pertains to lock-throw transmission means adapted to function between a primary and a secondary lock mechanism, and is particularly adapted for use in locks incorporating the lock-controlled assembly feature in which the lock consists of a primary lock mechanism called a core and a secondary lock mechanism called a housing, said core and said housing being adapted to be releasably locked together by key means.

The principal object of this invention is to provide lock-throw transmission means of novel and efficient construction for connecting a secondary lock-throw member with a key-operated part of a primary lock mechanism in such a manner that lost motion will be provided for the key-operated member before and after a period of transmitted lock throw movement of the secondary mechanism.

A second object is to so construct the transmission means that any desired angular movement may be imparted to the secondary lock throw member by a uniform angular movement of the primary key operated member.

Other objects of the invention will be apparent from the following description taken in connection with the accompanying drawings.

In master-keyed systems of such locks in which the housings are all provided with identical core reception features adapted to receive identical or similarly functioning cores, it oftens happens that the secondary mechanisms, by the very nature of the case require different angular movements of their actuating mechanisms. For instance, when the secondary mechanism constitutes the secondary part of a padlock, a movement of only a few degrees of angular motion of the actuating mechanism is all that is ordinarily required or desired, while when the secondary mechanism constitutes a cylinder lock used as the primary unit of some types of mortise door locks, a complete revolution or more of the secondary throw mechanism is often desired.

Hence, in such a system, it is desired that a transmission mechanism be inserted that can be varied to compensate for the differences required and at the same time utilize, in said system of locks, cores of common housing-mating features and having common angular throw delivering features.

Description of figures

In the accompanying drawings.

Structural description

Figure 1:
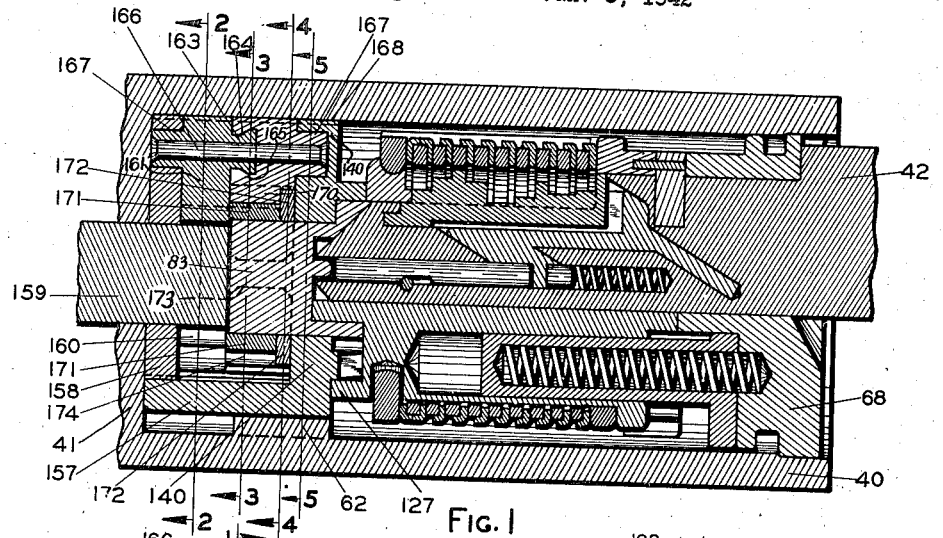
Figure 1 is a view in longitudinal section taken substantially on broken lines 1—1 of Figs. 2 to 5 inclusive, showing a lock throw transmission mechanism constructed in accordance with my invention, showing the connecting parts of primary driver means and secondary driver means.

Part 41 represents the inner end portion of a lock core housing 40 containing the lock-throw transmission mechanism adapted to drive secondary throw member 159 by primary core driver 83.

The throw means, Figs. 1, 2, 3, 4 and 5 of this lock, is positioned between the plate member 140 and the end 41 of the housing. This throw means includes gears and gear segments that are arranged to provide lost motion while the key 42 of the lock core 68 is being moved in certain portions of its cycle, and to provide a change in the gear ratio while the key is being moved through other portions of its cycle.

Three rigid arms 157, Figs. 1, 2, 3 and 4, are provided on the plate member 140 and extend toward the end 41 of the lock housing. A circular plate 158 is riveted or otherwise rigidly secured to the end portions of the arms 157 and rests against the end 41 of the housing. A secondary throw member 159, Fig. 1, is journaled in the plate 158 and in the housing end 41 and extends to the exterior of the primary lock mechanism. This throw member 159 may be connected with any desired secondary lock mechanism for operating the same.

Figure 2:
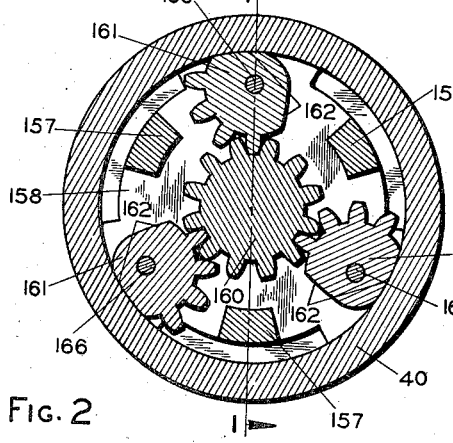
Fig. 2 is a cross section taken on broken line 2—2 of Fig. 1.

A gearwheel 160, Figs. 1 and 2, is rigidly connected with the throw member 159 within the lock housing.

A number of gear segments 161, positioned within the lock housing 40, mesh with the gearwheel 160, Figs. 1 and 2. Each gear segment 161 has two surfaces 162 positioned at approximately right angles to each other and adapted to engage with the sides of the lock housing 40 to limit angular movement of the gear segments 161 to substantially ninety degrees. Obviously the amount of angular movement allowed to the gear segments 161 may be varied by varying their shape. Also the gear ratio between segments 161 and gearwheel 160 may be varied to secure more or less angular movement of the throw member 159 in proportion to a given movement of the gear segments 161.

Figure 3:
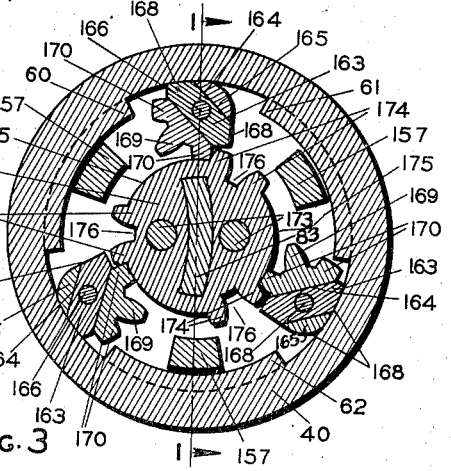
Fig. 3 is a cross section taken on broken line 3—3 of Fig. 1.

Each gear segment 161 has a transverse spline or key 163, Figs. 1 and 3, on one side that fits into a suitable keyway 164 in another gear segment 165 and locks the two gear segments 161 and 165 against relative turning movement. A rivet 166 extends axially through each pair of gear segments 161 and 165 and cooperates with the spline means 163 to complete a rigid connection between the two gear segments 161 and 165 of each pair.

To facilitate construction, gear segments 161 and 165 are preferably made of two pieces, but obviously they would function and serve in the same manner if made of one piece.

Figure 5:
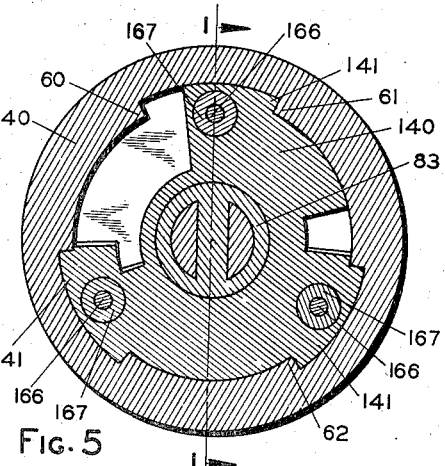
Fig. 5 is a cross section taken on broken line 5—5 of Fig. 1.

Each gear segment 161 and 165 has a cylindrical hub member 167 on its outermost side, Figs. 1 and 5. The hub members 167 of the gear segments 161 are journaled in the end plate 158 while the hub members 167 of the gear segments 165 are journaled in the plate member 140. This provides bearing means rigid with the lock housing for each pair of gear segments. Preferably the openings in the plate 140 that receive the hubs 167 are blind openings that do not extend entirely through said plate 140.

Each gear segment 165 has two surfaces 168 positioned at substantially right angles to each other and adapted to engage with the wall of the housing 40 to limit the angular movement of the gear segments 165 to substantially ninety degrees. If no other stop means were provided in the lock these gear segments would stop rotary movement of the core parts at the end of the operative cycle.

Each gear segment 165 also has one relatively long gear tooth 169 and two relatively short gear teeth 170 positioned on opposite sides of the long gear tooth 169.

Figure 4:
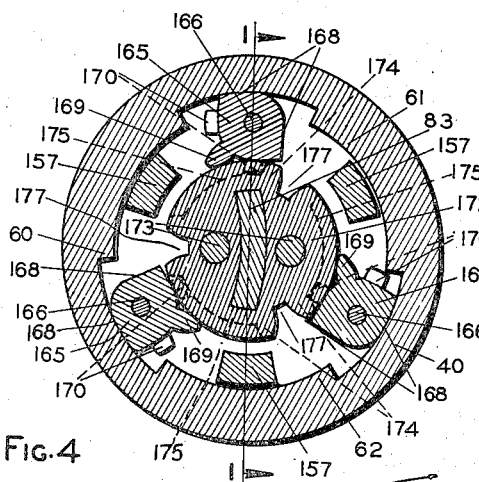
Fig. 4 is a cross section taken on broken line 4—4 of Fig. 1.

The gear segments 165 cooperate with an interrupted gear of novel construction that is made up of a thicker gear member 171 and a thinner disc like member 172 secured together by rivets or pins 173, see Figs. 1, 3 and 4. The thicker gear member 171 is provided at three equidistantly spaced apart points with pairs of gear teeth 174. Smooth arcuate sections 175 are provided on the periphery of the gear member 171 between the pairs of gear teeth 174.

The arcuate sections 175 are formed at the proper radial distance from the center of the gear members 171 so that they will barely touch or will be clear of the ends of the shorter teeth 170 of the gear segments 165. The recesses 176 between the two teeth 174 of each pair of teeth are deep enough for the reception of the longer gear teeth 169 of the gear segments 165.

The disc like member 172 has three recesses 177 in its periphery that are of the same shape and depth as the recesses 176 and register with said recesses 176. To facilitate construction, the gear parts 171 and 172 are preferably made in two pieces but obviously they would function in the same manner if made in one piece.

The longer gear teeth 169 of the segments 165 overlap the disc members 172, while the shorter gear teeth 170 thereof are only co-extensive with the gear members 171 and do not overlap the disc members 172.

The blade like end of member 83, comprising the primary throw member, extends through the interrupted gear formed by parts 171 and 172 and constitutes a primarily operated means for angularly moving or driving this interrupted gear 171—172.

Obviously if the interrupted gear 171—172 is moved clockwise from the position shown in Figs. 3 and 4 it will first move through an angle of approximately sixty degrees without rotatively moving the segments 165. While this movement is taking place the long teeth 169 are supported on the periphery of the disc 172 and the arcuate sections 175 are moving past the short teeth 170 without tending to turn the gear segments 165. At the end of a period of idling movement the gear teeth 174 on the interrupted gear 171 will encounter the short teeth 170 of the gear segments 165 and at this same time the long teeth 169 of segments 165 will register with the recesses 176. This starts rotation of the gear segments 165 and turns them through an angle of approximately ninety degrees, after which the long gear teeth 169 again engage with the periphery of the disc 172, and clockwise rotary movement of the interrupted gear 171—172 may continue through substantially another sixty degrees while the gear segments 165 idle and do not turn.

Upon reverse or counterclockwise movement of the interrupted gear 171—172 the gear segments 165 will be similarly operated in a reverse direction to provide alternate idling and operating periods of said segments. Thus if angular movement of the key in the lock starts at the beginning of an idling period of the gear segments 165 and continues to the end of the next idling period of said gear segments 165 it will provide, for the throw member 159, first an idling period, then a period of operation, and then another idling period while the key and primary lock mechanism are continuously moved.

The object of the idle or lazy motion during the first part of the primary mechanism's motion is to afford pick up and trial portions of the primary mechanism's motion before rotative movement is transmitted to the secondary mechanism. The object of the idle or lazy motion after the operating phase of the primary mechanism's motion is to afford an overtravel of the primary mechanism without actuating the secondary mechanism for lock-controlled assembly purposes of the primary mechanism constituting a lock core 68.

Housing 40 is provided with internal lugs 60, 61 and 62 adapted to form fit lugs 141 of plate 140 to prevent rotative movement of the transmission mechanism as a whole relative to said housing 40.

The transmission element as a whole is secured against endwise displacement in housing 40 by end 41 and otherwise such as by press fitting plate 140 in housing 40.

Operation

At the time that the primary driver 83 begins to move clockwise from the starting position which is the position shown, the interrupted gear 171—172 of the throw mechanism will simultaneously begin to move clockwise from the position shown in Figs. 3 and 4. In the starting position the long teeth 169 of the gear segments 165 are resting on the circumferential portion of the disc member 172 and the end of one shorter tooth 170 of each gear segment 175 is pointed toward the center of interrupted gear member 171 and positioned so that it will move along one of the smooth peripheral surfaces 175 of said interrupted gear member 171.

During clockwise movement of the primary driver 83 through a pickup and trial portion of the lock core's cycle, the interrupted gear 171—172 will move rotatively without turning the gear segments 165 on their axes. At substantially the time the driver 83 reaches the end of the trial portion of its movement a short tooth 170 of each gear segment 165 will be engaged by a tooth 174 of the gear member 171 and the gear segments 165 will begin to move rotatively, the long teeth 169 entering the recesses 177 and 176, see Figs. 4 and 3. These gear segments 165, as illustrated, will be rotated through an angle of substantially ninety degrees while the key and gear member 171—172 are moving clockwise through the sixty degrees representing the operating portion of the core's cycle. The recesses 177 and 176 receive the longer teeth 169 as the gear segments 165 rotate. At the end of about ninety degrees of rotary movement of the gear segments 165 the long tooth 169 of each gear segment 165 will again rest on a peripheral portion of the disc 172 and will prevent further rotary movement of the gear segments 165 in the event the driver 83 is turned beyond the end of the operating portion of the cycle.

It is intended that the only key that can and will turn driver 83 beyond the end of the operating portion of the cycle is a control key when it is being used for the removal of the lock core from the lock housing 40, all as set forth in my co-pending application.

Rotation of the gear segments 165 is transmitted directly to the gear segments 161 which, in the present instance, act through the gear member 160 to rotatively move the throw member 159 through the same angle as the gear segments 165 and 161 but in the opposite direction.

From the above described operation of the throw mechanism it will be apparent that said throw mechanism provides lost motion at the beginning of the cycle of operation of the driver 83 to prevent turning of the throw member 159 while the parts of the lock core mechanism are being moved through the pick-up and trial portion of their cycle. Also it will be apparent that this throw mechanism will transmit substantially ninety degrees of rotary movement to the throw member 159 while the driver 83 is moving through substantially sixty degrees of the operating portion of the cycle. Also it will be apparent that this throw mechanism is capable of providing for substantially sixty degrees of lost motion beyond the end of the operating portion of the cycle in the event the lock core is to be removed from the housing. Obviously other desired gear ratios between the key operated driver 83 and the throw member 159 and other degrees of lazy motion both before and after the operating cycle can be obtained by varying the relative sizes of the gear members 161 and 160 and related parts.

This throw mechanism is further adapted to provide corresponding inverse lost motion and rotary motion of the several parts of the throw mechanism as driver 83 is rotatively moved in a counterclockwise direction from the end of the operating or control position back to the starting position.

In many types of locks the throw mechanism herein disclosed is enlarged and changed in many ways. For instance the hub of one of the gears 161 may be made the main throw member in the secondary lock mechanism in case it is desirable that the throw member be off center as respects the lock housing. Such a set-up is disclosed in U. S. Letters Patent No. 2,138,856, issued December 6, 1938.

When this structure is used the throw pin is aligned on the axis of the lock core and any forcible rotating of core and housing could not unlock the secondary lock.

Having thus described my invention, what I claim as new, and desire to secure by Letters Patent is:

1. In a lock, two lock throw members, and lost motion means interconnecting said two lock throw members providing lost motion therebetween at the beginning and end of a period of lock operation.

2. In a lock, two lock throw members, and interrupted gear means interconnecting said two lock throw members providing lost motion therebetween at the beginning and end of a period of lock operation.

3. In a lock having a lock core locked within a housing and removable by the operation of a key, two lock throw members, and lost motion means interconnecting said two lock throw members providing lost motion therebetween at the beginning and end of a period of lock operation.

4. In a lock having a lock core locked within a housing by key operated means, two lock throw members, and interrupted gear means interconnecting said two lock throw members providing lost motion therebetween at the beginning and end of a period of lock operation.

5. In a lock having a lock core locked within a housing by key operated means, two lock throw members, and change speed interrupted gear means interconnecting said two lock throw members providing lost motion therebetween at the beginning and end of a period of lock operations and providing variable speed therebetween during lock operation.

6. In a secondary lock mechanism, a primary and a secondary throw member, said primary throw member being adapted to be actuated by key means, and, in turn, being adapted to actuate the secondary throw member, lost motion means interconnecting said throw members and providing periods of lost motion ahead of, and following, the period of transmitted motion employed in unlocking the lock.

7. In a secondary lock mechanism adapted to house a removable core, a primary and a secondary throw member, said primary throw member being adapted to be actuated by key means, and, in turn, being adapted to actuate the secondary throw member, lost motion means interconnecting said throw members and providing a period of lost motion following the period of the transmitted motion employed in unlocking the lock.

8. In a secondary lock mechanism, a primary and a secondary throw member, said primary throw member being adapted to be actuated by key means, and, in turn, being adapted to actuate the secondary throw member, lost motion means interconnecting said throw members and providing a period of lost motion following the period of the transmitted motion employed in unlocking the lock, for core removal purposes.

9. In a secondary lock mechanism, adapted to house a removable key-operated lock core, a primary and a secondary throw member, said primary throw member being adapted to be actuated by key means through substantially 120° of rotary motion of said core means, from its key-insertion position, for lock operative purposes and through an additional substantially 60° of rotary motion for core removal purposes, said secondary throw member being adapted to be actuated by the primary throw member only during the aforesaid 120° of rotary motion of said primary throw member, lost motion means interconnecting said throw members and providing a period of idle overtravel of said primary throw member during said additional 60° of core means movement for core removal purposes.

10. In a secondary lock mechanism, adapted to house a removable key-operated lock core, a primary and a secondary throw member, said primary throw member being adapted to be actuated by key means through a core-removing cycle of practically 180° of rotary motion between its key-insertion and core-removal positions, said secondary throw member being adapted to be actuated by the primary throw member only during practically the middle 60° of said 180° of rotary motion of said primary throw member, lost motion means interconnecting said throw members and providing periods of substantially 60° of lost motion before and after said middle 60° of transmitted motion.

11. In a secondary lock mechanism, adapted to house a removable key-operated lock core, a primary and a secondary throw member, said primary throw member being adapted to be actuated by key means through a core-removing cycle of practically 180° of rotary motion from its key-insertion to its core-removal position, said secondary throw member being adapted to be actuated by the primary throw member only during practically the middle 60° of said 180° of rotary motion of said primary throw member, and gear means adapted to convert said middle 60° of said motion of said primary throw member into practically 90° of angular motion in said secondary throw member.

12. In a secondary lock mechanism, adapted to house a removable key-operated lock core, a primary and a secondary throw member, said primary throw member being adapted to be actuated by key means through a core-removing cycle of practically 180° of rotary motion from its key-insertion to its core-removal position, said secondary throw member being adapted to be actuated by the primary throw member only during practically the middle 60° of said 180° of rotary motion of said primary throw member, and gear means adapted to convert said middle 60° of said motion of said primary throw member into another number of degrees of angular motion in said secondary throw member.

FRANK ELLISON BEST.

REFERENCES CITED

The following references are of record in the file of this patent:

UNITED STATES PATENTS

| Number | Name | Date |
| --- | --- | --- |
| 978,964 | Voight | Dec. 20, 1910 |
| 2,049,742 | Lowe | Aug. 4, 1936 |